(12) United States Patent
Wada et al.

(10) Patent No.: US 10,139,524 B2
(45) Date of Patent: Nov. 27, 2018

(54) ANTI-REFLECTIVE STRUCTURE AND METHOD FOR DESIGNING SAME

(71) Applicant: DEXERIALS CORPORATION, Tokyo (JP)

(72) Inventors: Yutaka Wada, Utsunomiya (JP); Mitsuo Arima, Sendai (JP)

(73) Assignee: DEXERIALS CORPORATION, Tokyo (JP)

( * ) Notice: Subject to any disclaimer, the term of this patent is extended or adjusted under 35 U.S.C. 154(b) by 134 days.

(21) Appl. No.: 15/104,456

(22) PCT Filed: Jan. 5, 2015

(86) PCT No.: PCT/JP2015/050049
§ 371 (c)(1),
(2) Date: Jun. 14, 2016

(87) PCT Pub. No.: WO2015/105071
PCT Pub. Date: Jul. 16, 2015

(65) Prior Publication Data
US 2016/0313474 A1 Oct. 27, 2016

(30) Foreign Application Priority Data

Jan. 10, 2014 (JP) ................................ 2014-003483

(51) Int. Cl.
*G02B 1/118* (2015.01)
*B29C 59/02* (2006.01)
*G02B 27/00* (2006.01)

(52) U.S. Cl.
CPC ............ *G02B 1/118* (2013.01); *B29C 59/022* (2013.01); *G02B 27/0012* (2013.01); *B29C 2059/023* (2013.01)

(58) Field of Classification Search
CPC .......... G02B 1/10–1/18; G02F 1/133–1/13394
See application file for complete search history.

(56) References Cited

U.S. PATENT DOCUMENTS 7,070,849 B2 * 7/2006 Mori ................. B29C 45/14811
428/141
8,507,841 B2 * 8/2013 Endoh ................ G02B 27/0018
250/216
(Continued)

FOREIGN PATENT DOCUMENTS

| EP | 2487279 A1 | 8/2012 |
| JP | H04-155226 A | 5/1992 |
| JP | 2009-139796 A | 6/2009 |
| JP | 2011-053496 A | 3/2011 |

(Continued)

OTHER PUBLICATIONS

Aug. 17, 2017 Extended Search Report issued in European Patent Application No. 15735604.9.
(Continued)

*Primary Examiner* — William R Alexander
*Assistant Examiner* — Jeffrey Madonna
(74) *Attorney, Agent, or Firm* — Oliff PLC

(57) ABSTRACT

A method for designing anti-reflective structure in which plurality of nanostructures formed of projected portions on substrate surface are provided at intervals equal to or less than visible light wavelength, in order to reduce chroma ($\sqrt{(a^{*2}+b^{*2})}$) of reflected light with respect to white light to as close to zero as possible, average height of nanostructures from flat portion of substrate surface is 180 nm or greater and 290 nm or less; and filling rate of nanostructures, i.e., ratio of area of bottom surface of nanostructures to area of substrate surface in plan view of anti-reflective structure is defined, in terms of relationship between filling rate and chroma ($\sqrt{(a^{*2}+b^{*2})}$) of reflected light from anti-reflective structure with respect to white light, so as to fall within range of ±5% of filling rate at which chroma takes on minimum value.

21 Claims, 8 Drawing Sheets

1A

(56) References Cited

U.S. PATENT DOCUMENTS

| | | | |
|---|---|---|---|
| 8,747,683 B2* | 6/2014 | Isurugi | B29C 33/424 216/56 |
| 8,998,429 B2* | 4/2015 | Fukuda | G02B 27/42 359/601 |
| 2011/0051249 A1 | 3/2011 | Endoh et al. | |
| 2011/0128629 A1 | 6/2011 | Takahashi et al. | |
| 2012/0024794 A1 | 2/2012 | Fischmann | |
| 2012/0147472 A1* | 6/2012 | Kajiya | B32B 3/30 359/601 |
| 2012/0234794 A1* | 9/2012 | Isurugi | B29C 33/424 216/56 |
| 2016/0194778 A1* | 7/2016 | Shakagoori | B29C 59/046 359/601 |
| 2016/0313474 A1* | 10/2016 | Wada | B29C 59/022 |

FOREIGN PATENT DOCUMENTS

| | | |
|---|---|---|
| JP | 2012-151012 A | 8/2012 |
| JP | 2013-142821 A | 7/2013 |
| WO | 2011/065429 A1 | 6/2011 |
| WO | 2012/133943 A1 | 10/2012 |

OTHER PUBLICATIONS

Aug. 1, 2017 Notification of Reasons for Refusal issued in Japanese Patent Application No. 2014-003483.
Feb. 10, 2015 Search Report issued in International Patent Application No. PCT/JP2015/050049.
Feb. 10, 2015 Written Opinion issued in International Patent Application No. PCT/JP2015/050049.

* cited by examiner (x-x cross-sectional view)

Cone (H=180nm), Hexagonal Lattice
Arrangement, Refractive Index 1.5

Cone (H=200nm), Hexagonal Lattice
Arrangement, Refractive Index 1.5

Cone (H=230nm), Hexagonal Lattice
Arrangement, Refractive Index 1.5

Cone (H=290nm), Hexagonal Lattice
Arrangement, Refractive Index 1.5

Cone (H=150nm), Hexagonal Lattice
Arrangement, Refractive Index 1.5

Cone (H=250nm), Tetragonal Lattice
Arrangement, Refractive Index 1.5

Elliptic Cone (H=250nm), Hexagonal Lattice Arrangement, Refractive Index 1.5

Elliptic Cone (H=250nm), Tetragonal Lattice Arrangement, Refractive Index 1.5

Cone (H=250nm), Hexagonal Lattice Arrangement, Refractive Index 1.1

Cone (H=250nm), Hexagonal Lattice Arrangement, Refractive Index 3.0

ANTI-REFLECTIVE STRUCTURE AND METHOD FOR DESIGNING SAME

TECHNICAL FIELD

The present invention relates to a method for designing an anti-reflective structure having a moth-eye structure and to an anti-reflective structure obtained by the method.

BACKGROUND ART

To improve visibility by reducing the reflection of ambient light when observing an object to be observed such as displays or printed matters, it is commonly performed to provide, on a surface of the object to be observed, a so-called moth-eye film that has surface asperity (i.e., nanostructures) at a pitch of a visible light wavelength or less. The moth-eye film is also used to be provided on a surface of a light-emitting device or a surface of an optical component such as a lens other than an object to be observed.

Disclosed in WO2012/133943 (Patent Literature 1) is that, to improve the anti-reflective properties of such a moth-eye film, the filling rate of nanostructures is to be 65% or greater and 100% as the upper limit. Here, the filling rate refers to the area of the bottom surface of nanostructures to the area of a unit lattice of the arrangement of the nanostructures that form the moth-eye film.

On the other hand, disclosed in Japanese Patent Application Laid-Open No. 2012-151012 (Patent Literature 2) is a transparent conductive element configured from an optical component having a moth-eye structure and a transparent conductive layer provided thereon, in which the percentage of the area of a flat portion is preferably 0 to 30% in order to provide an improved visibility by reducing wavelength dependency. Here, the percentage of the area of the flat portion is defined to be the ratio of the remaining area obtained by subtracting the bottom area of the nanostructures from the unit lattice area of the moth-eye structure to the unit lattice area.

CITATION LIST

Patent Literature

Patent Literature 1: WO 2012/133943
Patent Literature 2: Japanese Patent Application Laid-Open No. 2012-151012

SUMMARY OF INVENTION

Technical Problem

A conventional moth-eye film may cause a rise in reflectivity on the longer-wavelength and shorter-wavelength sides of a visible light wavelength region depending on the shape and arrangement of individual nanostructures that constitute the moth-eye structure. It is described in the above-mentioned Patent Literatures that the filling rate of nanostructures or the area percentage of a flat portion affects the color tone of the moth-eye film; however, no detailed discussions were made.

On the other hand, to manufacture the nanostructures of a resin by transfer from an original master, the viscosity of the resin significantly affects the reproducibility of the shape of the projected portion of the nanostructure to be transferred. That is, a high viscosity may cause a lack in the filling property or followability for the asperities provided on the original master, so that the resulting manufactured nanostructure may have a height less than that of the nanostructure designed for the original master and may be shaped to have a rounder tip than intended.

Furthermore, for continuous transfer from the original master, it is concerned that the nanostructure may be reduced in height, though by a small amount, from the start to end of the transfer by the resin itself being buried in the recessed portions of the original master. When the original master is continuously used to manufacture raw moth-eye films, this problem is not limited to one raw film but may be continued with other raw films to be subsequently manufactured.

The raw moth-eye film manufactured by the nanostructures being transferred from the original master may be formed in a roll or cut into sheets for transportation. During such handling, there may occur a problem, for example, that some nanostructures drop out due to unwanted friction. Likewise, a problem of the same kind may be caused by a work for affixing the moth-eye film to an object to be treated for antireflection purposes. To address this problem, it is conceivable to form the moth-eye film of a resin having a low modulus of elasticity when the moth-eye film is provided on a surface of a substrate that is subjected to contact or wear at high frequencies. However, the dropout of a nanostructure cannot be resolved.

As mentioned above, it is concerned that there may occur variations in the height or dropouts of nanostructures in each step of manufacture, transportation, affixing work, and use of the moth-eye film. The occurrence of variations in the height or dropouts of nanostructures may lead to a change in spectral reflectivity or variations in color tone. Thus, such a design method for accommodating variations in color tone within a certain range is required.

An object of the present invention is to provide an anti-reflective structure having a moth-eye structure, wherein by finding a design condition for reducing the chroma ($\sqrt{a^{*2}+b^{*2}}$) of reflected light with respect to a white light source as close to zero as possible, the color tone of an object of interest with the anti-reflective structure provided on a surface thereof is controlled or prevented from changing from the original color tone of the object of interest.

The inventors have found that an anti-reflective structure having a moth-eye structure, in which when the height of individual nanostructures constituting the moth-eye structure falls within a particular range, the chroma ($\sqrt{a^{*2}+b^{*2}}$) of reflected light with respect to white light is varied depending on the filling rate of nanostructures and takes on a minimum value at a particular filling rate. As a result of this finding, the present invention has been conceived of.

Solution to Problem

That is, the present invention provides a method for designing an anti-reflective structure in which a plurality of nanostructures formed of projected portions on a substrate surface are provided at intervals equal to or less than a visible light wavelength, the method being configured such that an average height of the nanostructures from a flat portion of the substrate surface is 180 nm or greater and 290 nm or less; and a filling rate of the nanostructures, i.e., a ratio of an area of a bottom surface of the nanostructures to an area of the substrate surface in a plan view of the anti-reflective structure is defined, in terms of a relationship between the filling rate and a chroma ($\sqrt{a^{*2}+b^{*2}}$) of reflected light from the anti-reflective structure with respect to white light, so as to fall within a range of ±5%, preferably 0 to −5%, of the filling rate at which the chroma takes on a minimum value.

The present invention also provides an anti-reflective structure in which a number of nanostructures formed of projected portions on a substrate surface are provided at intervals equal to or less than a visible light wavelength, the anti-reflective structure being configured such that an average height of the nanostructures from a flat portion of the substrate surface is 180 nm or greater and 290 nm or less; and a filling rate of the nanostructures, i.e., a ratio of an area of a bottom surface of the nanostructures to an area of the substrate surface in a plan view of the anti-reflective structure is 85% or greater and less than 100%.

Here, the aforementioned average height of nanostructures is determined from an average of measurements obtained by measuring the surface asperity of the anti-reflective structure preferably five times or more by an atomic force microscope (AFM) along a given one direction within a plane of the anti-reflective structure. Furthermore, the variation of individual measurement values is determined from a ratio of a difference between each measurement value and the average thereof to the average ([(each measurement value−the average of each measurement value)/the average of each measurement value]×100(%)). Furthermore, this measurement is preferably performed in a shorter direction of the anti-reflective structure when the anti-reflective structure is formed by transfer in the shape of a long film using a roll-shaped original master for transfer. Hereinafter, "the average height of the nanostructures" will be abbreviated as "the height of the nanostructures."

Advantageous Effects of Invention

According to the method for designing an anti-reflective structure of the present invention, it is possible to noticeably prevent an adherend, to which the anti-reflective structure is attached, from being observed to be unnecessarily colored because the chroma ($\sqrt{(a^{*2}+b^{*2})}$) of reflected light with respect to white light is reduced to as close to zero as possible in terms of the relationship with the filling rate of the nanostructures.

Furthermore, according to the anti-reflective structure of the present invention, it is possible to prevent an object to be observed, to which the anti-reflective structure of the present invention is affixed, from being viewed as colored even in the presence of variations in the height of the nanostructures due to the manufacturing method because the chroma ($\sqrt{(a^{*2}+b^{*2})}$) of reflected light with respect to white light is reduced.

DESCRIPTION OF EMBODIMENTS

Figure 1A:
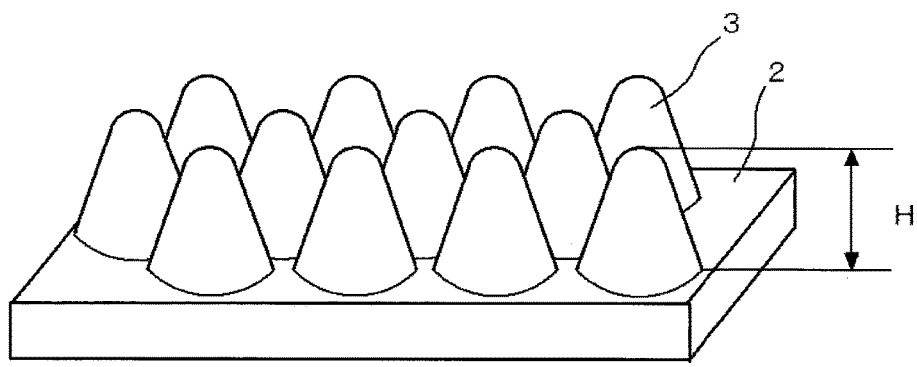
FIG. 1A is a perspective view illustrating an anti-reflective structure 1A according to an embodiment.

Now, referring to the drawings, a description will be made to the present invention in more detail. Note that in each figure, the same symbols denote the same or identical components.

Figure 1B:
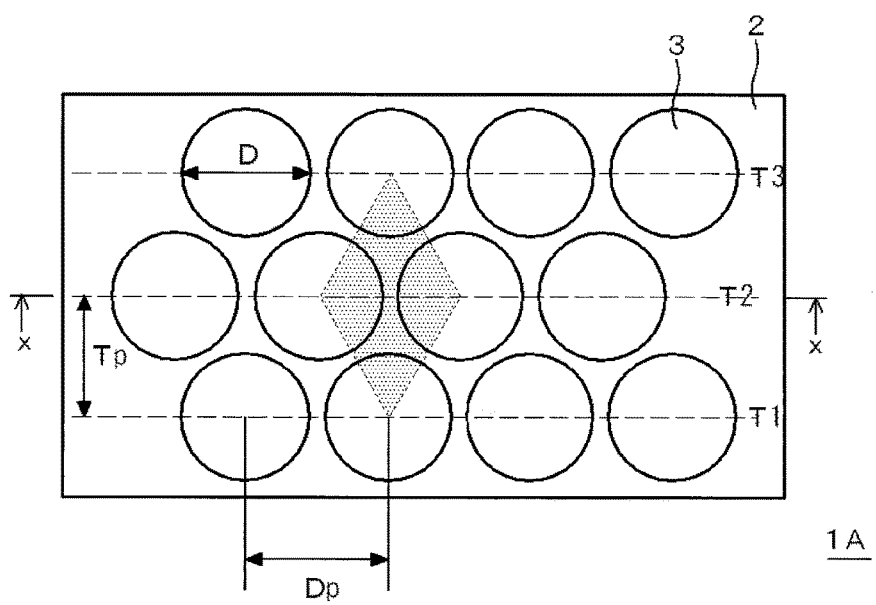
FIG. 1B is a top view of an anti-reflective structure 1A according to an embodiment.
Figure 1C:
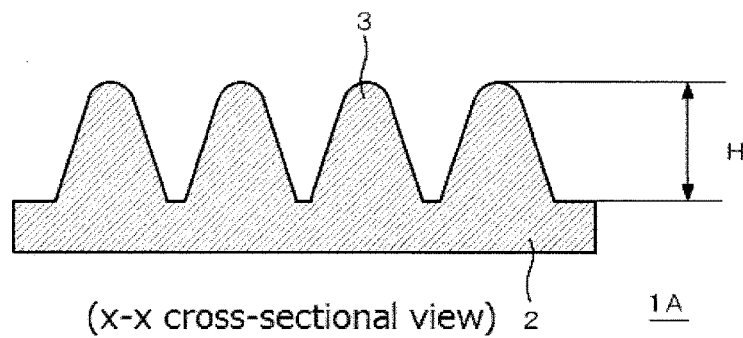
FIG. 1C is cross-sectional view illustrating an anti-reflective structure 1A according to an embodiment.

FIG. 1A is a perspective view illustrating an anti-reflective structure 1A according to an embodiment of the present invention, FIG. 1B is a top view, and FIG. 1C is a cross-sectional view taken along line x-x in FIG. 1B.

The anti-reflective structure 1A is provided with a moth-eye structure in which a number of nanostructures 3 formed of projected portions on a surface of a transparent substrate 2 are arranged in rows and columns at a pitch equal to or less than a visible light wavelength. More specifically, tracks T1, T2, and T3 along which a number of nanostructures 3 are arranged at a given arrangement pitch Dp are arranged in large numbers at a given track pitch Tp, and the centers of nanostructures 3 are arranged in the hexagonal lattice. Here, the arrangement pitch Dp is typically 150 nm or greater and 270 nm or less, and the track pitch Tp is typically 130 nm or greater and 190 nm or less.

Furthermore, the individual nanostructures 3 have a conical shape with the vertex rounded or a shape that can be viewed as bell-shaped, and have an aspect ratio (the height H of the nanostructures/the track pitch Tp) of 0.95 or more and 2.2 or less.

Note that the shape of the nanostructures 3 of the present invention is not limited to the conical shape or the bell shape, but may also take various types of shapes such as an elliptic conical shape, hemispherical shape, semi-elliptical shape, columnar shape, or acicular shape.

Furthermore, the nanostructures may also be arranged in the tetragonal lattice other than the hexagonal lattice, or in a quasi-tetragonal lattice or a quasi-hexagonal lattice according to those lattices. Here, the hexagonal lattice refers to an arrangement in which the center of a nanostructure is positioned at each corner and the center of a regular hexagon. Furthermore, the tetragonal lattice refers to an arrangement in which the center of a nanostructure is positioned at each corner of a square. The quasi-tetragonal lattice or the quasi-hexagonal lattice refers to a lattice that is deformed, for example, by elongating the tetragonal lattice or the hexagonal lattice in the track direction, and is classified as an intermediate type with respect to the tetragonal lattice or the hexagonal lattice. Furthermore, the invention is applicable even when the nanostructures are arranged at random by taking the filling rate as the ratio of the area of the bottom surface of the nanostructures to the area of the substrate surface in the plan view of the anti-reflective structure. That is, regardless of the regularity of the filling structure of the nanostructures, the present invention is applicable so long as the chroma takes on the minimum value at a particular filling rate in terms of the relationship between the filling rate of the nanostructures and the chroma ($\sqrt{(a^{*2}+b^{*2})}$) of reflected light from the anti-reflective structure with respect to white light.

The anti-reflective structure 1A is characterized in that the height H of the nanostructures from a flat portion of the substrate surface is 180 nm or greater and 290 nm or less; and the filling rate of the nanostructures, i.e., the ratio between the area of the bottom surface of the nanostructures 3 to the area of the unit lattice of the arrangement of the nanostructures 3 is 85% or greater and less than 100%. This allows the chroma ($\sqrt{(a^{*2}+b^{*2})}$) of reflected light from the anti-reflective structure 1A with respect to white light to be reduced to as close to zero as possible in terms of the relationship with the filling rate of the nanostructures 3, and when the anti-reflective structure 1A is provided on a surface of an adherend to observe the resulting adherend, it is possible to prevent the adherend from being observed to be unnecessarily colored. This is based on the finding by the inventors that when the refractive index of the substrate 2 falls within the range of at least 1.1 or more and 3.0 or less, and the height H of the nanostructures 3 from a surface flat portion of the substrate 2 falls within the range of 180 nm or greater and 290 nm or less, the chroma ($\sqrt{(a^{*2}+b^{*2})}$) takes on the minimum value with the filling rate of the nanostructures 3 in the range of 85% or more and less than 100% in terms of the relationship between the filling rate of the nanostructures 3 and the chroma ($\sqrt{(a^{*2}+b^{*2})}$) of the anti-reflective structure 1A.

Figure 2A:
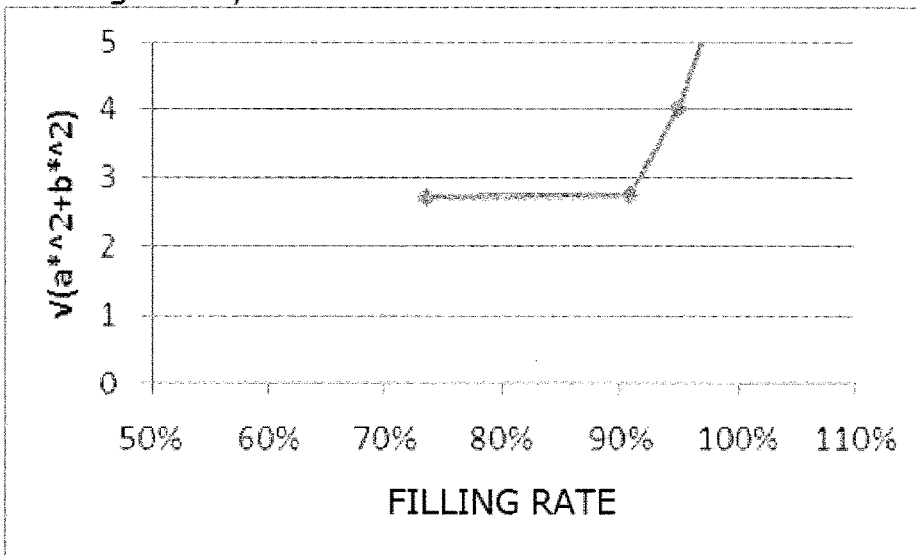
FIG. 2A is a view showing the relationship between the filling rate and the chroma ($\sqrt{(a^{*2}+b^{*2})}$) of nanostructures (180 nm in height H).

That is, FIG. 2A is a view showing the relationship between the filling rate of the nanostructures 3 and the chroma ($\sqrt{(a^{*2}+b^{*2})}$) when the height H of the nanostructures 3 is 180 nm, and the refractive index of the substrate 2 is 1.50 in the anti-reflective structure 1A with the conical or bell-shaped nanostructures 3 shown in FIG. 1A being arranged in the hexagonal lattice.

Here, the filling rate is a ratio of the area of the bottom surface of the nanostructures 3 to the area of an unit lattice, and can be computed by the equation below as the ratio (%) of the sector-shaped areas S2 of the four nanostructures included in a rhombus shown in FIG. 1B to the area S1 of the rhombus.

The filling rate (%)=(S2/S1)×100.

Furthermore, the chroma ($\sqrt{(a^{*2}+b^{*2})}$) is calculated and determined by a method in conformity with JIS Z8729. That is, the chromaticity a* and b* in the L*a*b* color system are computed and determined from a reflection spectrum at wavelengths 380 nm to 780 nm.

Figure 2B:
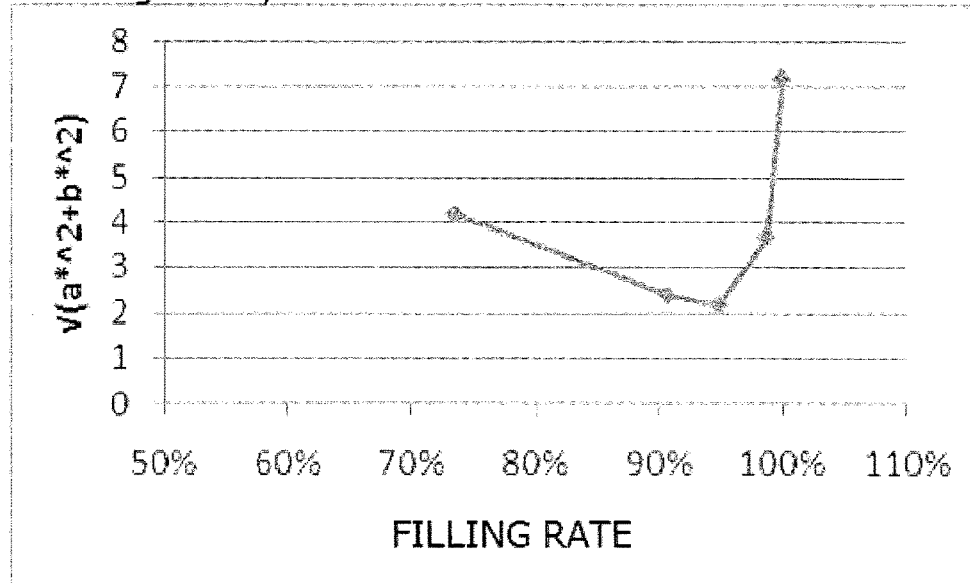
FIG. 2B is a view showing the relationship between the filling rate and the chroma ($\sqrt{(a^{*2}+b^{*2})}$) of nanostructures (200 nm in height H).
Figure 2C:
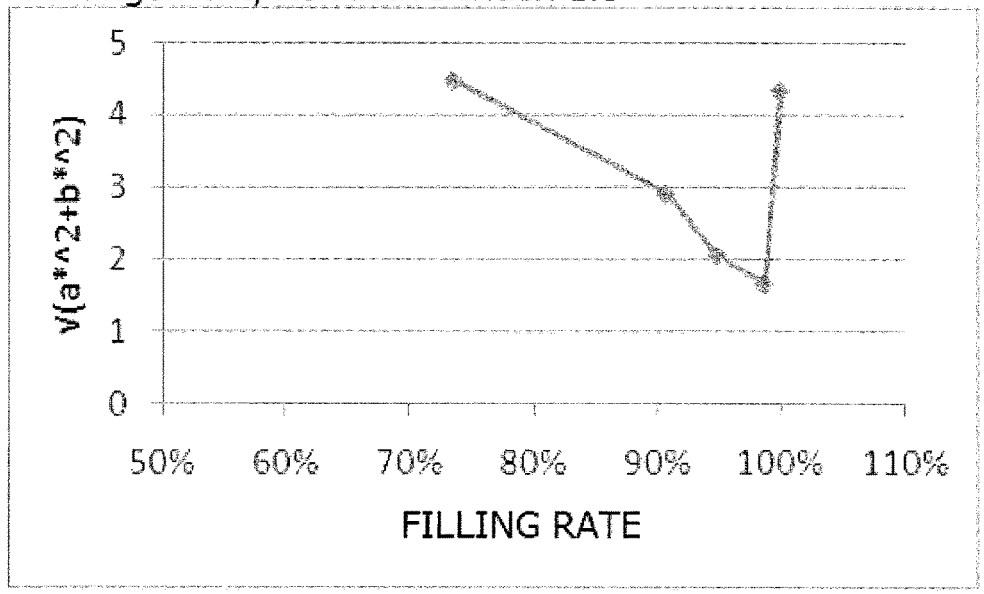
FIG. 2C is a view showing the relationship between the filling rate and the chroma ($\sqrt{(a^{*2}+b^{*2})}$) of nanostructures (230 nm in height H).
Figure 2D:
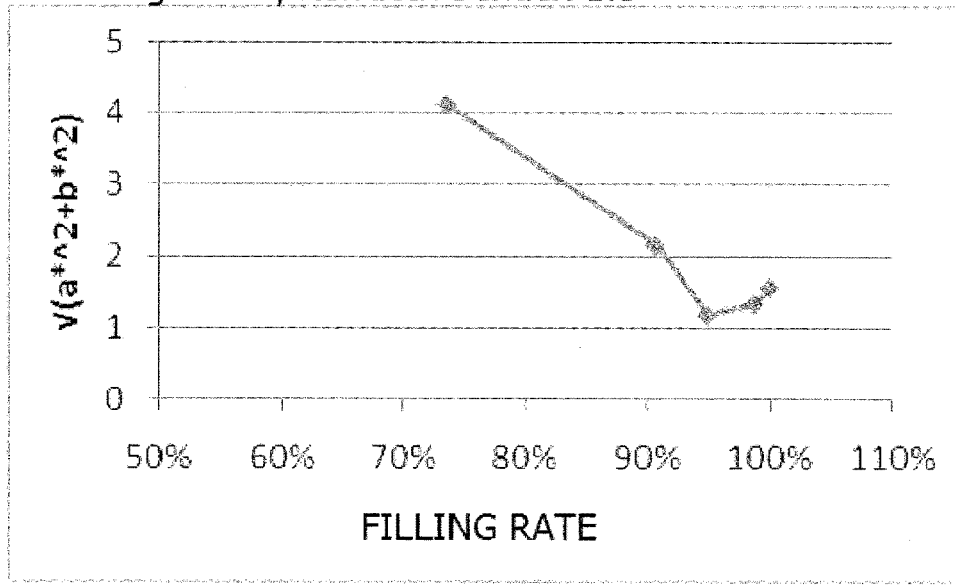
FIG. 2D is a view showing the relationship between the filling rate and the chroma ($\sqrt{(a^{*2}+b^{*2})}$) of nanostructures (290 nm in height H).
Figure 2E:
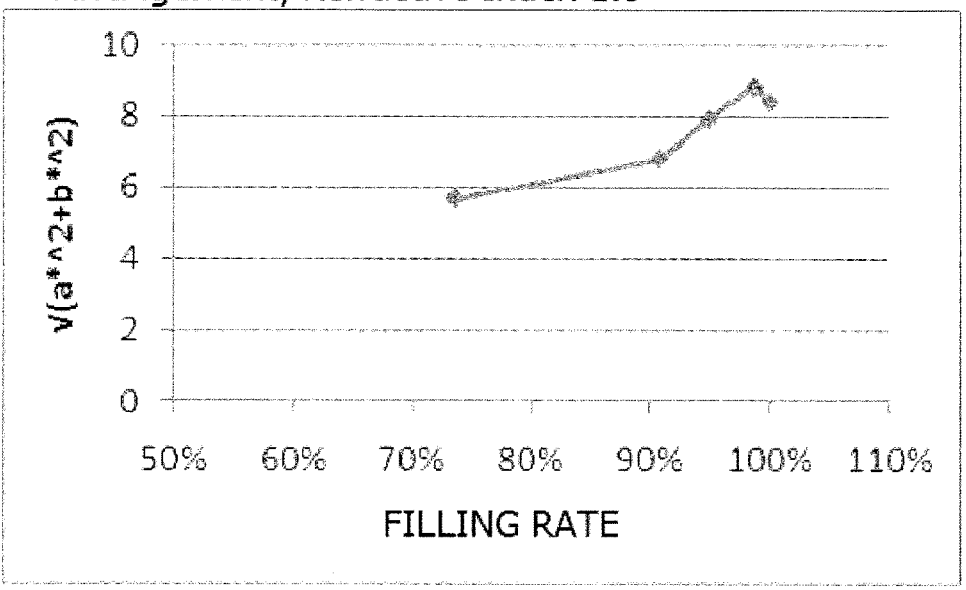
FIG. 2E is a view showing the relationship between the filling rate and the chroma ($\sqrt{(a^{*2}+b^{*2})}$) of nanostructures (150 nm in height H).

FIG. 2B is a relational view for an identical anti-reflective structure with the height H of the nanostructures being 200 nm; FIG. 2C is a relational view for an identical anti-reflective structure with the height H of the nanostructures being 230 nm; FIG. 2D is a relational view for an identical anti-reflective structure with the height H of the nanostructures 3 being 290 nm; and FIG. 2E is a relational view for an identical anti-reflective structure with the height H of the nanostructures 3 being 150 nm. From these relational views, it is seen that when the height H of the nanostructures falls within the range of 180 nm or greater and 290 nm or less, the chroma ($\sqrt{(a^{*2}+b^{*2})}$) takes on the minimum value at a filling rate of 95 to 99%. Thus, the filling rate and the height of the nanostructures showing the minimum value can be set, thereby providing an anti-reflective film that exhibits a stable color tone.

Note that with the height H of the nanostructures being 180 to 290 nm, a point of inflection taking on the minimum value (in the vicinity of an endpoint of the bottom) is regarded as a minimum value for convenience when the chroma ($\sqrt{(a^{*2}+b^{*2})}$) does not take on a minimum value but is generally horizontal at the minimum value as shown in FIG. 2A.

In contrast to this, when the height H of the nanostructures 3 is less than 180 nm in an identical anti-reflective structure 1A, a minimum value is not found in the chroma ($\sqrt{(a^{*2}+b^{*2})}$) between the filling rates of 75 and 100%, but on the contrary, a maximum value is found as shown in FIG. 2E.

Note that even with the height H of the nanostructures being 180 nm or greater, the chroma ($\sqrt{(a^{*2}+b^{*2})}$) suddenly increases as the filling rate becomes higher from near 100% beyond the same. This is estimated to be because with the filling rate exceeding 100%, the lower end portions of adjacent nanostructures may overlap each other, causing the height H of the nanostructures to be substantially decreased.

That is, according to the present invention, it can be said that the anti-reflective structure is prevented from being colored by tightly filling the nanostructures in a manner such that the nanostructures are positioned not so close to each other as to substantially reduce the height H of the nanostructures.

On the other hand, as shown in FIG. 2D, the minimum value occurs at a filling rate of 95% when the nanostructures 3 have a height H of 290 nm. This allows it to be achieved simultaneously to improve anti-reflective properties by improving the filling rate and to reduce the chroma. However, a height H of the nanostructures 3 greater than 290 nm leads to an increase in the aspect ratio of the nanostructures 3, which makes it more difficult to smoothly transfer the shape from an original master when an anti-reflective structure is manufactured by transfer using the original master.

Furthermore, with the height H of the nanostructures 3 being greatly varied, the chroma ($\sqrt{(a^{*2}+b^{*2})}$) does not easily exhibit a distinctive minimum value in terms of the relationship between the filling rate and the chroma ($\sqrt{(a^{*2}+b^{*2})}$) of the nanostructures. In this context, a variation in the height H of the nanostructures is preferably within 10%.

As discussed above, the method for designing an anti-reflective structure of the present invention is configured such that when the height H of the nanostructures 3 is 180 nm or greater and 290 nm or less, preferably 200 nm or greater and 270 nm or less, and more preferably 200 nm or greater and 250 nm or less, and variations in the height H of the nanostructures 3 are preferably 10% or less, and more preferably 8.7% or less, the filling rate is set in such a manner that the chroma ($\sqrt{(a^{*2}+b^{*2})}$) takes on a minimum value and a value in the vicinity thereof in terms of the relationship between the height H, the filling rate, and the chroma ($\sqrt{(a^{*2}+b^{*2})}$) of the nanostructures 3. This makes it possible to reduce the chroma ($\sqrt{(a^{*2}+b^{*2})}$) of the anti-reflective structure 1A to as close to zero as possible, and prevent an adherend, to which the anti-reflective structure is affixed, from being viewed as colored to the extent possible.

Note that in the relational views showing the relationship between the filling rate and the chroma ($\sqrt{(a^{*2}+b^{*2})}$) of the nanostructures 3, the numerical value of the chroma ($\sqrt{(a^{*2}+b^{*2})}$) when the chroma ($\sqrt{(a^{*2}+b^{*2})}$) takes on the minimum value and the numerical value of the filling rate at that time are varied depending on, for example, the arrangement of the nanostructures 3, the shape of the nanostructures 3, and the refractive index of the substrate 2 on which the nanostructures 3 are formed. However, within the range of refractive indexes from 1.1 to 3.3, the chroma ($\sqrt{(a^{*2}+b^{*2})}$) can be reduced to near the minimum value regardless of the material.

Figure 3A:
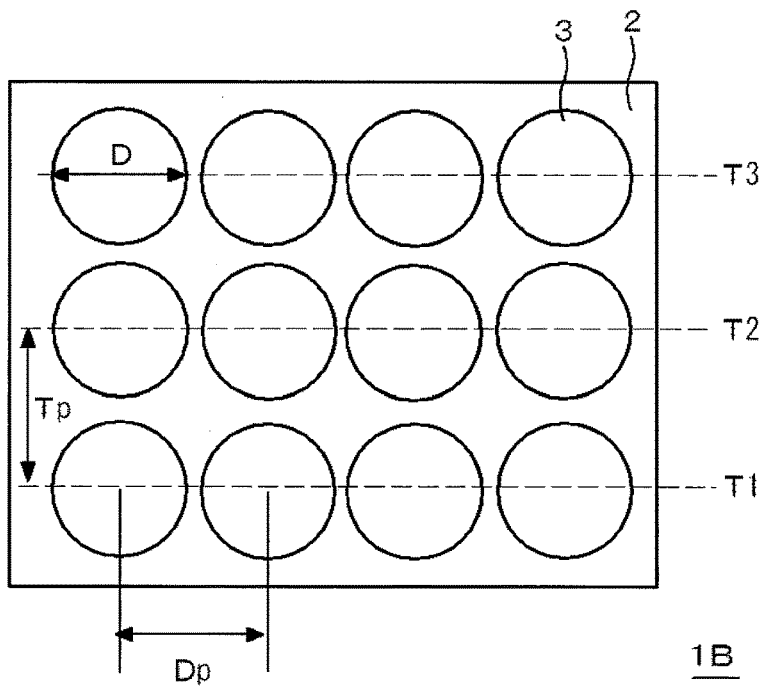
FIG. 3A is a top view illustrating an anti-reflective structure 1B in which conical nanostructures are arranged in the tetragonal lattice.
Figure 3B:
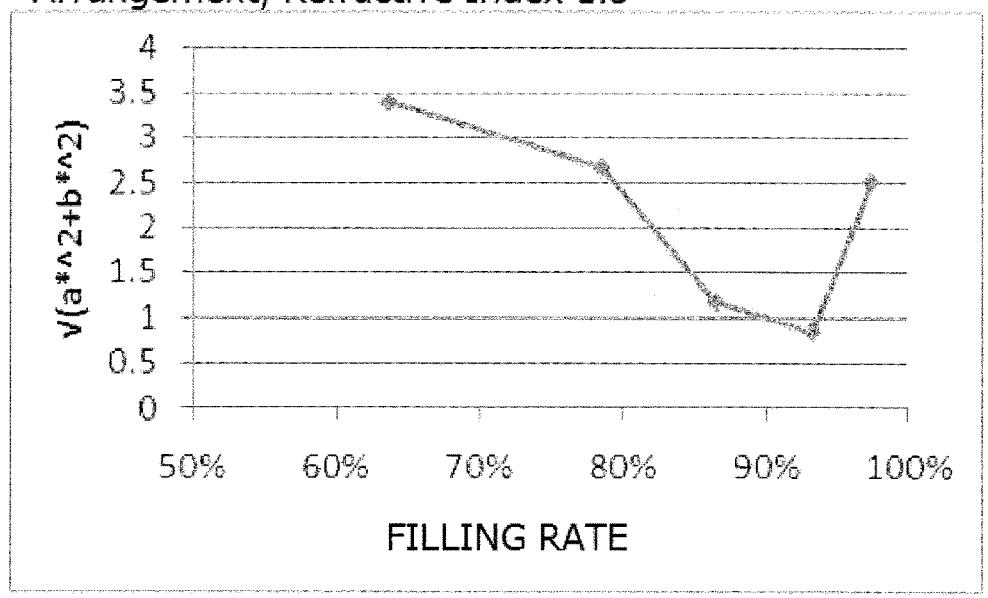
FIG. 3B is a view showing the relationship between the filling rate and the chroma ($\sqrt{(a^{*2}+b^{*2})}$) of nanostructures in an anti-reflective structure 1B.

For example, consider an anti-reflective structure 1B in which conical (bell-shaped) nanostructures (of a refractive index of 1.5) identical to the nanostructures 3 of the anti-reflective structure 1A shown in FIG. 1A are arranged in the tetragonal lattice as shown in FIG. 3A. In this case, the relationship between the filling rate and the chroma ($\sqrt{(a^{*2}+b^{*2})}$) when the height H of the nanostructures 3 is 250 nm exhibits a minimum value near a filling rate of 93% as shown in FIG. 3B.

Figure 4A:
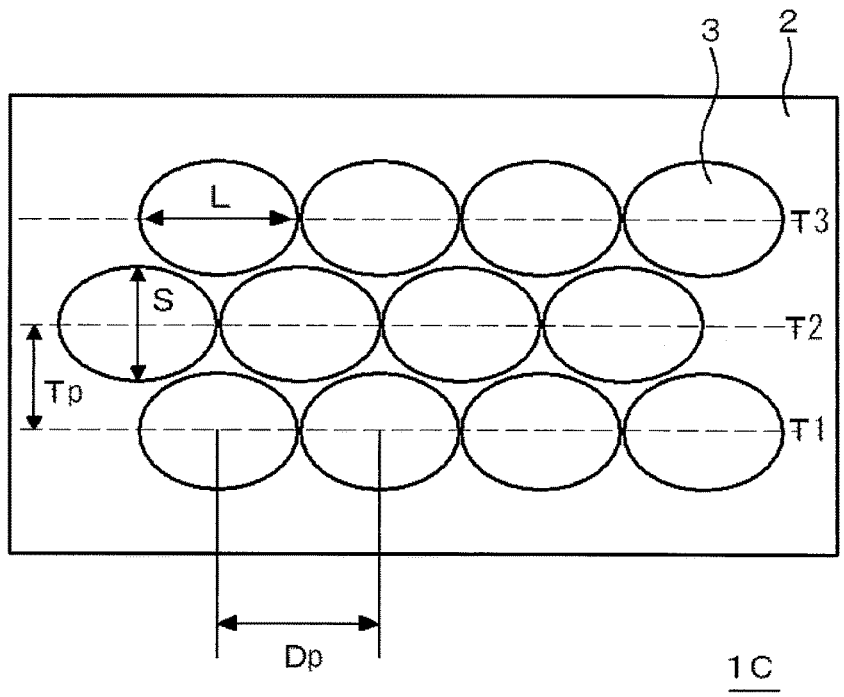
FIG. 4A is a top view illustrating an anti-reflective structure 1C in which elliptic conical nanostructures are arranged in the hexagonal lattice.
Figure 4B:
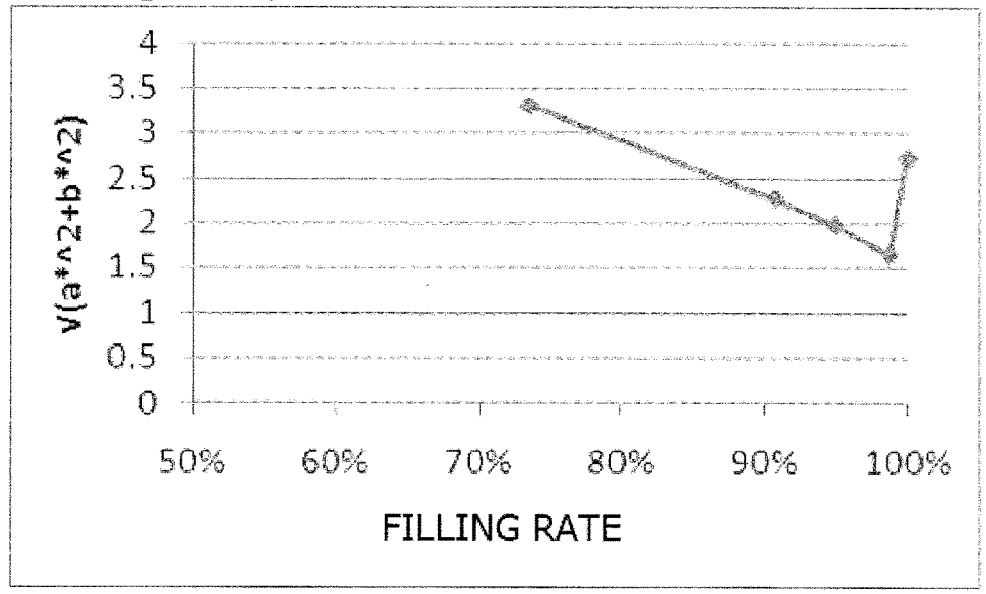
FIG. 4B is a view showing the relationship between the filling rate and the chroma ($\sqrt{(a^{*2}+b^{*2})}$) of nanostructures in the anti-reflective structure 1C.

Furthermore, consider an anti-reflective structure 1C in which the bottom surface of the nanostructures 3 in the anti-reflective structure 1A shown in FIG. 1A is given an elliptical shape to thereby make the nanostructures 3 elliptic conical (bell-shaped) as shown in FIG. 4A, and the resulting elliptic conical (bell-shaped) nanostructures 3 are arranged in the hexagonal lattice. In this case, the relationship between the filling rate and the chroma ($\sqrt{(a^{*2}+b^{*2})}$) when the height H of the nanostructures 3 is 250 nm exhibits a minimum value in the vicinity of a filling rate of 99% as shown in FIG. 4B. When the ratio between the major axis L and the minor axis S (L/S) of the elliptic conical (bell-shaped) bottom surface shape is varied between 1 and 2, the chroma ($\sqrt{(a^{*2}+b^{*2})}$) exhibits the minimum value when the filling rate is 85% or greater and less than 100%.

Figure 5A:
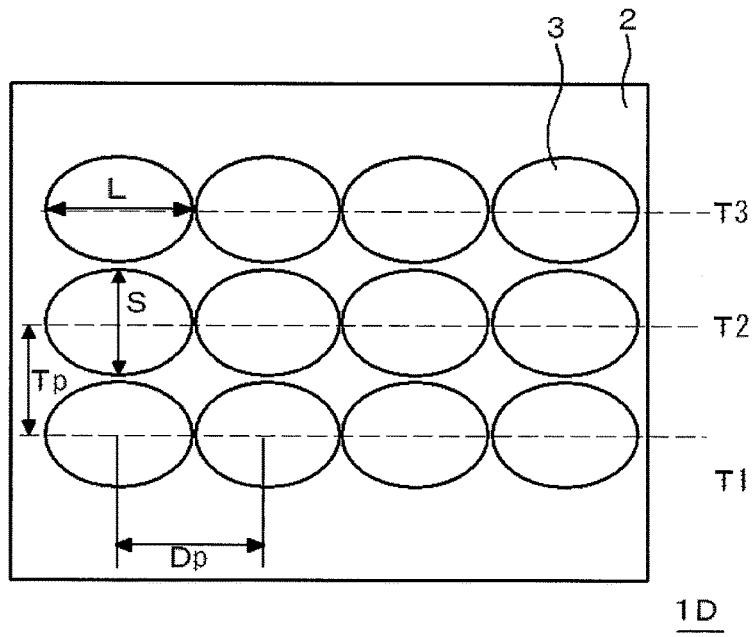
FIG. 5A is a top view illustrating an anti-reflective structure 1D in which elliptic conical nanostructures are arranged in the tetragonal lattice.
Figure 5B:
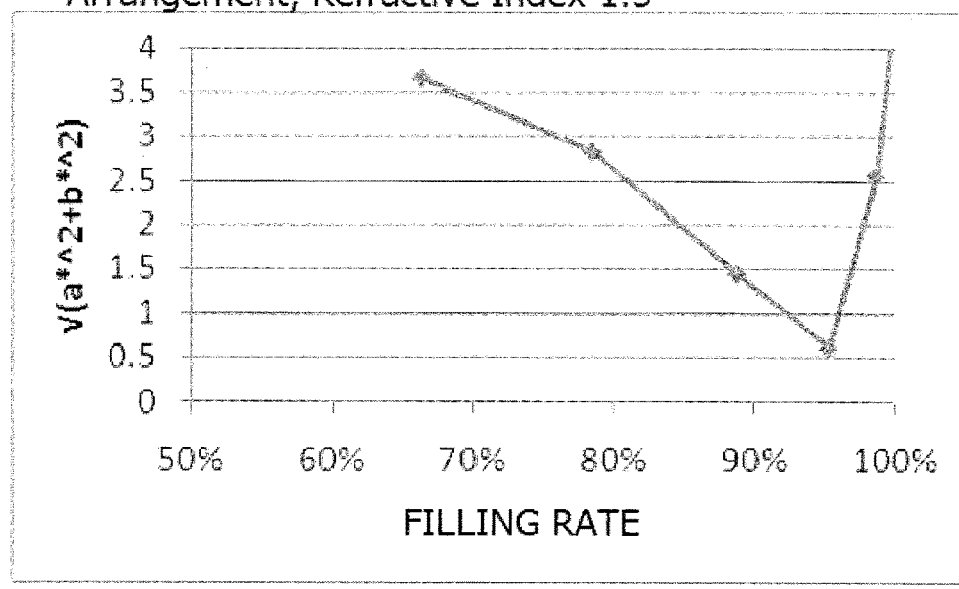
FIG. 5B is a view showing the relationship between the filling rate and the chroma ($\sqrt{(a^{*2}+b^{*2})}$) of nanostructures in the anti-reflective structure 1D.

Furthermore, consider an anti-reflective structure 1D in which the nanostructures 3 are made elliptic conical (bell-shaped) like the aforementioned anti-reflective structure 1C, and then the nanostructures 3 are arranged in the hexagonal lattice as shown in FIG. 5A. In this case, the relationship between the filling rate and the chroma ($\sqrt{(a^{*2}+b^{*2})}$) when the height H of the nanostructures 3 is 250 nm exhibits the minimum value in the vicinity of a filling rate of 95% as shown in FIG. 5B. In this case, when the ratio between the major axis L and the minor axis S (L/S) of the elliptic conical (bell-shaped) bottom surface shape is varied between 1 and 2, the chroma ($\sqrt{(a^{*2}+b^{*2})}$) exhibits the minimum value when the filling rate is 85% or greater and less than 100%.

Figure 6:
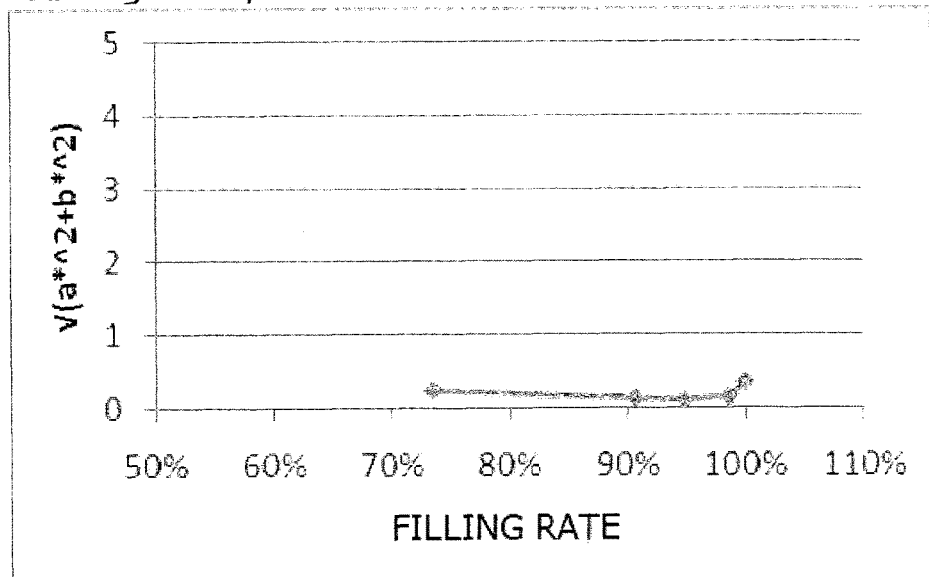
FIG. 6 is a view showing the relationship between the filling rate and the chroma ($\sqrt{(a^{*2}+b^{*2})}$) of nanostructures in the anti-reflective structure 1A for a refractive index of 1.1.
Figure 7:
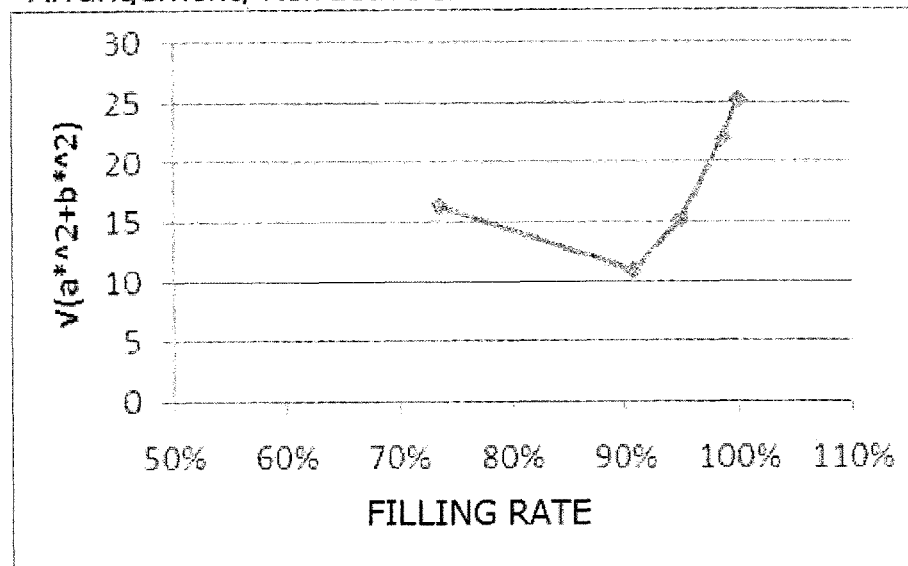
FIG. 7 is a view showing the relationship between the filling rate and the chroma ($\sqrt{(a^{*2}+b^{*2})}$) of nanostructures in the anti-reflective structure 1A for a refractive index of 3.0.

Furthermore, concerning the relationship between the refractive index and the chroma ($\sqrt{(a^{*2}+b^{*2})}$), consider a case where the refractive index is set to 1.1 when the height H of the nanostructures 3 is 250 nm in the anti-reflective structure 1A shown in FIG. 1A. In this case, as shown in FIG. 6, the gradient of the chroma ($\sqrt{(a^{*2}+b^{*2})}$) near the minimum value is not as great as that for the refractive index being 1.5, but the numerical value of the chroma ($\sqrt{(a^{*2}+b^{*2})}$) is low. In contrast to this, consider a case where the refractive index is set to 3.0 when the height H of the nanostructures 3 is 250 nm in the anti-reflective structure 1A shown in FIG. 1A. In this case, as shown in FIG. 7, the numerical value of the chroma ($\sqrt{(a^{*2}+b^{*2})}$) itself at the minimum value near a filling rate of 90% is greater than the minimum value when the refractive index is 1.5, but the gradient near the minimum value is great, exhibiting a distinctive minimum value. Thus, in the present invention, the refractive index of the substrate is 1.1 or more and 3.0 or less.

When the anti-reflective structure is used for a still-image display, the chroma ($\sqrt{(a^{*2}+b^{*2})}$) is preferably as close to zero as possible, but if the chroma is 2 or less, the surface provided with the anti-reflective structure may not be felt to be unnecessarily colored when observed. Thus, for use with a still image display, the chroma ($\sqrt{(a^{*2}+b^{*2})}$) may be 2 or less. Furthermore, from viewpoints of the anti-reflective performance, the chroma ($\sqrt{(a^{*2}+b^{*2})}$) may preferably exhibit a distinctive minimum value in terms of the relationship between the filling rate and the chroma ($\sqrt{(a^{*2}+b^{*2})}$). From these viewpoints, it is preferable for the anti-reflective structure for use with a still image display that the refractive index of the nanostructure be 1.5 or more and 3.0 or less, and the filling rate of the nanostructures be 85% or greater and less than 99%. The still image display may include a printed matter that may require a high resolution.

Furthermore, when the anti-reflective structure is an optical refractive index material such as an optical lens, the refractive index is preferably made close to that of the substrate. For example, when the anti-reflective structure is provided, for example, on a sapphire substrate, the refractive index may preferably be 1.7 or greater.

In contrast to this, when the anti-reflective structure is used by being affixed to a still image display or the like, the anti-reflective structure is desirably an anti-reflective structure that is filled uniformly at high density as in the manufacturing method of the present invention in view of a recent demand for high-resolution images. Furthermore, to improve the anti-reflective performance of the anti-reflective structure, the refractive index of the nanostructures is preferably brought as close to the refractive index of an ambient medium (the refractive index of air=1) as possible. For use in the air, it is preferable that the refractive index of the nanostructures be less than 1.5, and the filling rate of the nanostructures be 95% or greater and 99%.

Note that the method for manufacturing an anti-reflective structure of the present invention may be employed to manufacture the same by transfer using a roll original master. In this case, for example, as disclosed in WO 2012/133943, a roll of glass original master is first patterned by photo-lithography using a laser beam to form a pattern of fine asperities on the surface thereof, and then an anti-reflective structure is obtained by transferring the pattern of asperities to the resin that forms the anti-reflective structure. In this case, it is also acceptable to provide, as required, a substrate that is formed separately from the nanostructures 3 at the base portion of the nanostructures 3 of the anti-reflective structure according to the present invention.

The resulting anti-reflective structure is typically formed as a film, which may be formed in a roll or in sheets. The film in sheets includes those that are coded for each method of filling the nanostructures so as to be identified.

The anti-reflective structure of the present invention is preferably employed particularly for a medium for displaying still images such as printed matters or liquid crystal display devices, but may also be employed, without any particular problem, for various types of displays used for moving images.

REFERENCE SIGNS LIST 1A, 1B, 1C, 1D anti-reflective structure
2 substrate
3 nanostructure
Dp arrangement pitch
H height
Tp track pitch
T1, T2, T3 track

The invention claimed is:

1. A method for minimizing a chroma ($\sqrt{(a^{*2}+b^{*2})}$) of reflected light from an anti-reflective structure with respect to white light, the anti-reflective structure comprising a plurality of nanostructures that are formed of projected portions on a substrate surface and provided at intervals equal to or less than a visible light wavelength, the method comprising:
determining a minimum of the chroma ($\sqrt{(a^{*2}+b^{*2})}$) based on a filling rate of the nanostructures and a predetermined average height of the nanostructures; and
forming the plurality of nanostructures such that the filling rate is within a range of ±5% of the filling rate at which the minimum chroma value is achieved at the predetermined height, wherein
the filling rate is a ratio of an area of a bottom surface of the nanostructures to an area of the substrate surface in a plan view of the anti-reflective structure.

2. The method according to claim 1, wherein the nanostructures are arranged at a pitch equal to or less than a visible light wavelength, and the filling rate of the nanostructures is computed as a ratio of the area of the bottom surface of the nanostructures to an area of a unit lattice in the unit lattice of the arrangement of the nanostructures.

3. The method according to claim 1, wherein the minimum of the chroma ($\sqrt{(a^{*2}+b^{*2})}$) is 2 or less.

4. The method according to claim 2, wherein the filling rate of the nanostructures is set such that the minimum chroma ($\sqrt{(a^{*2}+b^{*2})}$) is 2 or less.

5. The method according to claim 1, wherein the average height of the nanostructures is in a range of 180 nm or greater and 290 nm or less.

6. The method according to claim 5, wherein the filling rate is within a range of 85% or more to less than 100%.

7. The method according to claim 1, wherein the minimum of the chroma ($\sqrt{(a^{*2}+b^{*2})}$) is determined based on a filling rate of the nanostructures, a predetermined average height, and a predetermined refractive index of the substrate, wherein
the average height of the nanostructures is in a range of 180 nm or greater and 290 nm or less, and
the refractive index of the substrate is within a range 1.1 or more and 3.0 or less.

8. The method according to claim 1, wherein the minimum of the chroma ($\sqrt{(a^{*2}+b^{*2})}$) is determined based on a filling rate of the nanostructures, a predetermined average height, a predetermined refractive index of the substrate, and a predetermined arrangement of the nanostructures, wherein
the average height of the nanostructures is in a range of 180 nm or greater and 290 nm or less,
the refractive index of the substrate is within a range of 1.1 or more and 3.0 or less, and
the nanostructures are arranged in a tetragonal lattice, the hexagonal lattice, a quasi-tetragonal lattice, or a quasi-hexagonal lattice.

9. The method according to claim 1, wherein the minimum of the chroma ($\sqrt{(a^{*2}+b^{*2})}$) is determined based on a filling rate of the nanostructures, a predetermined average height, a predetermined refractive index of the substrate, a predetermined arrangement of the nanostructures, and a predetermined shape of the nanostructures, wherein
the average height of the nanostructures is in a range of 180 nm or greater and 290 nm or less,
the refractive index of the substrate is within a range of 1.1 or more and 3.0 or less,
the nanostructures are arranged in a tetragonal lattice, the hexagonal lattice, a quasi-tetragonal lattice, or a quasi-hexagonal lattice, and
the nanostructures have a shape selected from one of a conical shape, a bell shape, elliptic conical shape, a hemispherical shape, a semi-elliptical shape, a columnar shape, or an acicular shape.

10. An anti-reflective structure comprising nanostructures formed of projected portions on a substrate surface, wherein
the nanostructures are provided at intervals equal to or less than a visible light wavelength,
an average height of the nanostructures from a flat portion of the substrate surface is 180 nm or greater and 290 nm or less,
a filling rate of the nanostructures, which is a ratio of an area of a bottom surface of the nanostructures to an area of the substrate surface in a plan view of the anti-reflective structure, is 85% or greater and less than 100%, and
a chroma ($\sqrt{(a^{*2}+b^{*2})}$) of reflected light from an anti-reflective structure with respect to white light is less than 3.

11. The anti-reflective structure according to claim 10, wherein the nanostructures are arranged at a pitch equal to or less than a visible light wavelength, and the filling rate of the nanostructures is computed as a ratio of the area of the bottom surface of the nanostructures to an area of a unit lattice in the unit lattice of the arrangement of the nanostructures.

12. The anti-reflective structure according to claim 10, wherein a variation in the height of the nanostructures from the flat portion of the substrate surface is within 10%.

13. The anti-reflective structure according to claim 10, wherein the anti-reflective structure is formed in a film shape, and a variation in the height of the nanostructures is within 10%.

14. The anti-reflective structure according to claim 13, wherein the anti-reflective structure is formed in film-shaped sheets.

15. The anti-reflective structure according to claim 11, wherein a variation in the height of the nanostructures from the flat portion of the substrate surface is within 10%.

16. The anti-reflective structure according to claim 11, wherein the anti-reflective structure is formed in a film shape, and a variation in the height of the nanostructures is within 10%.

17. The anti-reflective structure according to claim 12, wherein the anti-reflective structure is formed in a film shape, and a variation in the height of the nanostructures is within 10%.

18. The anti-reflective structure according to claim 15, wherein the anti-reflective structure is formed in a film shape, and a variation in the height of the nanostructures is within 10%.

19. The anti-reflective structure according to claim 16, wherein the anti-reflective structure is formed in film-shaped sheets.

20. The anti-reflective structure according to claim 17, wherein the anti-reflective structure is formed in film-shaped sheets.

21. The anti-reflective structure according to claim 18, wherein the anti-reflective structure is formed in film-shaped sheets.

* * * * *